United States Patent
Ozawa et al.

(10) Patent No.: US 7,711,986 B2
(45) Date of Patent: *May 4, 2010

(54) FAULT RECOVERY FOR TRANSACTION SERVER

(75) Inventors: Yohsuke Ozawa, Kanagawa-san (JP); Ryoh Neyama, Kanagawa-ken (JP); Hisashi Miyashita, Tokyo (JP); Mikio Takeuchi, Kanagawa-ken (JP); Gaku Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,263

(22) Filed: Jul. 13, 2008

(65) Prior Publication Data

US 2008/0270488 A1 Oct. 30, 2008

Related U.S. Application Data

(63) Continuation of application No. 11/215,697, filed on Aug. 30, 2005, now Pat. No. 7,519,859.

(51) Int. Cl.
*G06F 11/00* (2006.01)
(52) U.S. Cl. .................... 714/20; 714/6; 714/15
(58) Field of Classification Search ............ 714/5, 714/6, 15, 16, 17, 20
See application file for complete search history.

(56) References Cited

U.S. PATENT DOCUMENTS

| | | | |
|---|---|---|---|
| 6,035,379 A | 3/2000 | Raju et al. | 711/162 |
| 6,052,797 A | 4/2000 | Ofek et al. | 714/6 |
| 6,467,045 B2 | 10/2002 | Takeda | 714/5 |
| 6,477,617 B1 | 11/2002 | Golding | 711/112 |
| 6,681,339 B2 | 1/2004 | McKean et al. | 714/5 |
| 6,732,124 B1 | 5/2004 | Koseki et al. | 707/202 |
| 6,947,981 B2 | 9/2005 | Lubbers et al. | 709/223 |
| 6,970,987 B1 | 11/2005 | Ji et al. | 711/162 |
| 7,003,694 B1 | 2/2006 | Anderson et al. | 714/16 |
| 7,065,540 B2 | 6/2006 | Chandrasekaran et al. | 707/203 |
| 7,188,273 B2 | 3/2007 | Allen et al. | 714/6 |

(Continued)

OTHER PUBLICATIONS

Ramakrishnan et al.; Database Management Systems; 2000; McGraw-Hill Higher Education; Second Edition; pp. 571-578.*

(Continued)

*Primary Examiner*—Joshua A Lohn
(74) *Attorney, Agent, or Firm*—Vazken Alexanian

(57) ABSTRACT

A primary server transmits a write transaction to N backup devices. Each backup device records the write transaction to a local redo log stored at a high-performance storage and then transmits a notification to the primary device. When the primary device receives notifications from M of the N backup devices, it commits the write transaction, recording it to a low-performance storage. Once the write transaction has been recorded to the low-performance storage, the primary device requests that the backup devices delete their logs. If the primary device incurs a fault, one of the backup devices becomes the new primary device and determines which backup device has the newest local redo log. The backup device having the newest log sends it to the other backup devices, which update their local redo logs to the same state as the newest log. Thereafter, the new primary device is ready to resume transaction processing.

15 Claims, 5 Drawing Sheets

U.S. PATENT DOCUMENTS

| | | | |
|---|---|---|---|
| 7,228,398 B2 | 6/2007 | Iwamura et al. | 711/162 |
| 7,519,859 B2 * | 4/2009 | Ozawa et al. | 714/20 |
| 2004/0066273 A1 | 4/2004 | Cortina et al. | 340/5.1 |
| 2005/0138461 A1 | 6/2005 | Allen et al. | 714/4 |

OTHER PUBLICATIONS

Michael Wu et al., eNVy: A Non-Volatile, Main Memory Storage System, Procs. 6th Int'l Conf. on Arch'l Support for Prog'g Langs. and OS's, pp. 86-97 (1994).

A.E. Papathanasiou et al., Lightweight Transactions on Networks of Workstations, Technical Report 209, ICS-Forth (Sep. 1997).

Timothy Mann et al., A Coherent Distributed File Cache With Directory Write-Behind, ACM Transactions on Computer Systems (dated Jun. 10, 1993).

C. Mohan et al., Aries: A Transaction Recovery Method . . . , ACM Transactions on Database Systems, pp. 94-162 (Mar. 1, 1992).

* cited by examiner

FAULT RECOVERY FOR TRANSACTION SERVER

RELATED APPLICATIONS

The present patent application is a continuation of the previously filed patent application assigned Ser. No. 11/215,697, filed on Aug. 30, 2005.

FIELD OF THE INVENTION

The present invention relates generally to transaction servers, and more particularly to fault recover for such transaction servers.

BACKGROUND OF THE INVENTION

Transaction servers are servers that store data that is modifiable via transactions. A transaction generally and non-restrictively is a request to read, write, or update the data stored in a transaction server. Common transactions include orders, purchases, changes, additions, and deletions. Transaction servers are used in banking systems, stock and securities-trading systems, and other types of systems where it is important to ensure that any given transaction is never lost, and that the data can be recovered in the presence of a fault on the transaction server.

Transactions may update one or more master files that serve both as an audit trail and a history for future analyses. A major issue in a transaction-processing system is ensuring that all master files are updated before the transaction is considered completely processed. For example, if two files must be updated, but a system failure occurs after the first one but before the second one, the software has to be able to roll back the first update and start over later. Such a process may be referred to as a two-phase commit process.

More particularly, the two-phase commit process is a technique for ensuring that a transaction successfully updates all appropriate files in a distributed database environment. All servers involved in the transaction first confirm that the transaction has been received and is recoverable. Next, each server is told to commit the transaction by a transaction manager. Committing the transaction means that the request or activity of the transaction is actually performed. For instance, if a transaction involves updating data, committing the transaction means that the data is actually updated.

In a two-phase commit system, even if a given server shuts down due to a fault after the transaction manager has decided to commit the transaction, the consistency of the data can be recovered because the durability of the data is guaranteed at each server. However, in a two-phase commit process, a write has to be synchronously performed at all the servers. As a result, the completion of a commit process is as slow as the slowest server, such as the slowest storage device of any server, within the system. This can be detrimental to high-speed transaction processing.

Therefore, in general high-speed transaction processing means that a two-phase commit process and system cannot be employed. One alternative is the PERSEAS system, described in the prior art reference Athanasios E. Papathanasiou et al., "Lightweight Transactions on Networks of Workstations," Technical Report 209, September 1997, Institute of Computer Science, Crete, Greece. In the PERSEAS system, a memory-based database is mirrored to the memory of a different node or process. When a transaction updating the database is initiated, an undo log is first copied to the memory of a local process, and then the undo log is copied to the memory of a remote process. However, the PERSEAS system is useful primarily in memory-based databases, and does not result in performance enhancements where the database is ultimately written to a relatively low-performance storage device like a hard disk drive.

Another alternative is the Echo system described in the prior art reference Timothy Mann et al., "A Coherent Distributed File Cache with Directory Write-Behind," Research Report 103, June 1993, Digital Systems Research Center, Palo Alto, Calif. In the Echo system, a log is created for a process of changing the file system, and redundantly copied to a large number of cache servers, to improve the reliability of write-behind operations. A write-behind systems is one in which a transaction is not committed, or written, until copies of the transaction have been stored at a number of cache servers. However, the Echo system also not result in performance enhancements for updates that are ultimately applied to permanent, or non-volatile, storage devices like hard disk drives.

Thus, in a transaction-processing system, committed data should not be lost due to a fault within the transaction server. Therefore, the durability of the data is usually guaranteed by the writing the data to a database stored on a permanent, or non-volatile, storage device like a hard disk drive. However, a hard disk drive is a low-performance storage device, in that it has high latency and low throughput as compared to, for instance, volatile semiconductor memory. The PERSEAS and Echo systems that have been described provide solutions that are not related to such low-performance storage devices, and thus do not solve the problem of having a high-performance transaction-processing system in which fault recovery is guaranteed and that uses a low-performance storage device like a hard disk drive.

SUMMARY OF THE INVENTION

The present invention relates to fault recovery for a transaction server. A method of the invention includes a primary device, such as a primary server, receiving a write transaction. The primary server transmits the write transaction to N backup devices, such as N backup servers, where N is greater than one. Each backup device records the write transaction to a local redo log stored at a high-performance storage and transmits a notification to the primary device that the write transaction has been recorded. When the primary device receives notifications from M of the N backup devices, where M is less than N, the primary device commits the write transaction, including recording it to a low-performance storage. Once the primary device has received notification or confirmation that the write transaction has been recorded to the low-performance storage, it requests or instructs each backup device to delete the local redo log for the write transaction.

If the primary device incurs a fault, one of the backup devices becomes the new primary device. The new primary device determines which of the backup devices has the newest local redo log. Where the new primary device has the newest local redo log, it sends the newest local redo log to the other backup devices. Where one of the other backup devices has the newest local redo log, the new primary device requests that it send the newest local redo log to all other of the backup devices. As each backup device receives the newest local redo log, it updates its local redo log to the same state as the newest local redo log received. After this process is performed, the new primary device is ready to resume service, such that it is capable of receiving and committing additional or new write transactions.

A system of the present invention includes N backup devices and a primary device. Each backup device has a high-performance storage. The primary device is to transmit a write transaction to the N backup devices for recording to local redo logs stored at their high-performance storages, which may be volatile or non-volatile semiconductor memory. Upon receiving notifications from M of the N backup devices that the write transaction has been recorded, the primary device commits the write transaction. For instance, the system may include a low-performance storage, such as a hard disk drive. The primary device thus records the write transaction to the low-performance storage to commit the write transaction.

An article of manufacture of the invention includes a computer-readable medium and means in the medium. The computer-readable medium may be a recordable data storage medium, a modulated carrier signal, or another type of computer-readable medium. The means is for transmitting a write transaction to N backup devices for recording to local redo logs stored at high-performance storages of the N backup devices. The means is further for committing the write transaction upon receiving notifications from M of the N backup devices that the write transaction has been recorded.

Still other aspects and embodiments of the invention will become apparent by reading the detailed description that follows, and by referring to the accompany drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
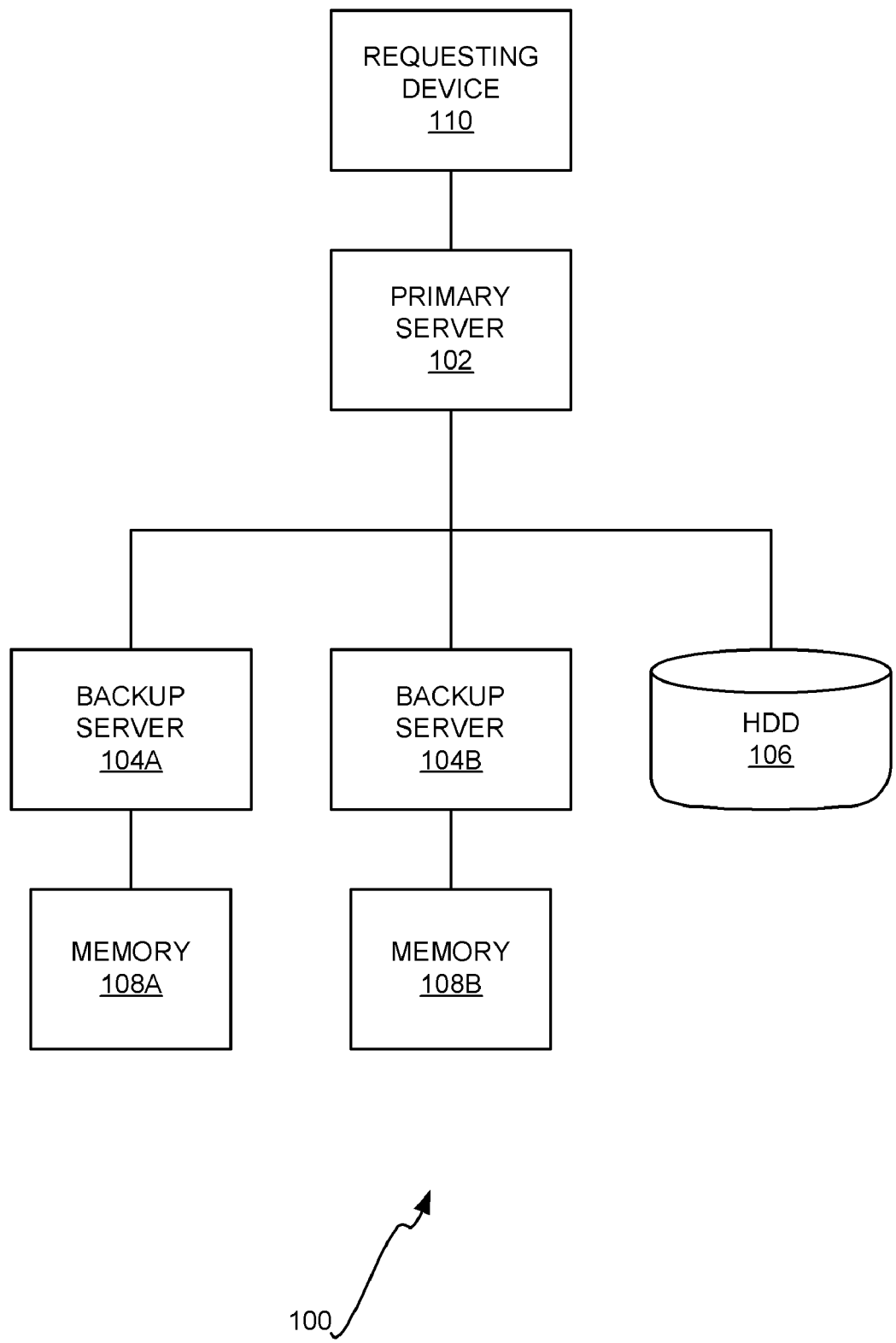
FIG. 1 is a diagram of a transaction-processing system, according to an embodiment of the invention.

FIG. 1 shows a transaction-processing system 100, according to an embodiment of the invention. The system 100 includes a primary server 102, a number of backup servers 104A and 104B, and a hard disk drive 106. The primary server 102 is more generally a primary device, and may include one or more computing devices. The primary server 102 is the interface through which requesting devices, such as the requesting device 110, send transactions for commitment within the transaction-processing system 100. As has been described, transactions are generally and non-restrictively requests to read, write, or update data stored within the system 100. The requesting device 110 may be another server, a client device, or another type of computing device.

The backup servers 104A and 104B are collectively referred to as the backup servers 104. The backup servers 104 are more generally each a backup device, and may each include one or more computing devices. The backup servers 104 provide a backup role to the primary server 102, and upon the primary server 102 incurring a fault such that it has to be shutdown, one of the backup servers 104 may become the new primary server. It is said that there are N backup servers 104, where N=2 in the specific embodiment depicted in FIG. 1. In general, however, there are N>1 of the backup servers 104.

The hard disk drive 106 is more generally a reliable storage device, in that data persisted to the hard disk drive 106 is guaranteed to be able to be read later in time. For instance, the hard disk drive 106 may be an array of hard disk drives configured in a redundant array of independent disks (RAID) configuration, or in another fault-tolerant configuration. However, the hard disk drive 106 is a low-performance storage device, as compared to other types of storage devices, such as semiconductor memories. That is, even if the hard disk drive 106 is a high-performance hard disk drive, such high-performance hard disk drives are nevertheless slower than other storage devices, like semiconductor memories. The hard disk drive 106 is the primary repository of the data of the transaction-processing system 100. In one embodiment, the hard disk drive 106 may be a part of an application server that is responsible for maintaining a database stored on the hard disk drive 106.

The backup servers 104 include semiconductor memories 108A and 108B, collectively referred to as the memories 108. The memories 108 are high-performance storage devices as compared to other types of storage devices, such as magnetic storage devices like the hard disk drive 106. That is, even if the memories 108 are low-performance semiconductor memories, such low-performance semiconductor memories are nevertheless faster than other storage devices, such as hard disk drives.

The memories 108, however, are unreliable storage devices. For instance, the memories 108 may be volatile memory devices that lose their contents when power is removed from the memories 108, in contradistinction to a non-volatile storage device, like the hard disk drive 106, which retains its contents when power is removed from the hard disk drive 106. Furthermore, even where the memories 108 are non-volatile memory devices, they may still be unreliable in that they do not have the reliability of other storage devices, like the hard disk drive 106. For instance, the hard disk drive 106 may be configured in a RAID configuration that provides fault tolerance should one of its constituent drives fails, whereas the memories 108 may not be configured in any sort of fault-tolerant configuration.

In general, the hard disk drive 106 has higher storage capability than the memories 108 do. For example, the hard disk drive 106 may have storage measured in terms of gigabytes or terabytes, whereas the memories 108 may just have storage measured in terms of megabytes or gigabytes. Thus, the hard disk drive 106, as the primary repository of the data of the transaction-processing system 100, is capable of storing all the data of the system 100. By comparison, at best the memories 108 can only store a portion of the data of the transaction-processing system 100, and may not be able to store all the data of the system 100.

Figure 2:
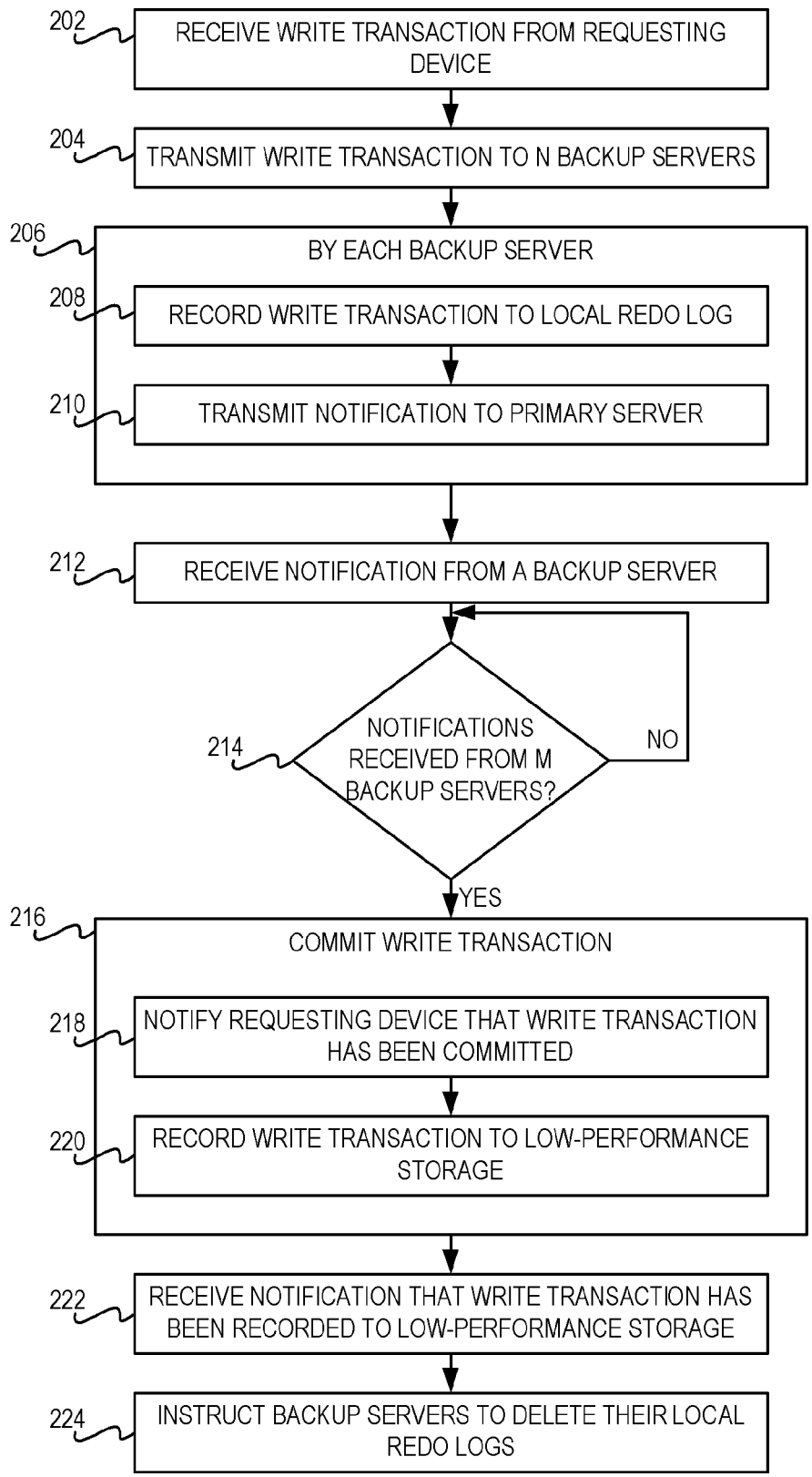
FIG. 2 is a flowchart of a method for committing transactions within the transaction-processing system of FIG. 1 in a high-performance manner, according to an embodiment of the invention, and is suggested for printing on the first page of the patent.

FIG. 2 shows a method 200 for committing a transaction within the transaction-processing system 100 of FIG. 1, according to an embodiment of the invention. The parts of the method 200 are performed by the primary server 102, except as otherwise indicated. For instance, the parts 208 and 210 of the method 200 are performed by each of the backup servers 104. The method 200 may be implemented in one embodiment as parts of a computer program stored on a computer-readable medium.

The primary server 102 receives a write transaction from the requesting device 110 (202). A write transaction is generally referred to herein as a transaction to create, modify, update, or delete data within the transaction-processing system 100. For instance, in a database system, a write transaction may be a request to create a new record, modify or update an existing recording, ot delete an existing record. The primary server 102 transmits the write transaction to all of the N backup servers 104 (204).

Each of the N backup servers 104 then performs the following (206). Each backup server first records the write transaction to a local redo log stored in its respective memory, such as one of the memories 108. A local redo log is a description of the write transaction. In one embodiment, the local redo log specifies the step or steps that have to be performed in order to effectuate the write transaction on the data stored in the hard disk drive 106. For example, a given write transaction may be to change the data of an existing record from A to B. To effectuate this write transaction, a new record may first be created in which the data thereof is B. The old record, having the data A, may then be deleted, and the new record, having the data B, replaced for the old record. Each backup server then sends a notification to the primary server 102 that it has thus recorded the write transaction (210).

The backup servers 104 may perform the parts 208 and 210 at different times. For instance, one of the backup servers 104 may be inherently faster than the other backup server and thus performs the parts 208 and 210 more quickly. Alternatively, one of the backup servers 104 may be currently processing other tasks, such that the other backup server performs the parts 208 and 210 more quickly, even if this latter backup server intrinsically operates at the same speed as or even slower than the former backup server. As a result, the primary server 102 receives a notification from a given backup server (212) at potentially different times.

If the primary server 102 has not yet received notifications from M of the N backup servers 104 (214), where M is less than N, then the primary server 102 waits until it has received notifications from M of the N backup servers 104, before it commits the write transaction (216). Thus, having more than one backup server 104—that is, having N>1—ensures that there is redundancy within the transaction-processing system 100, even with respect to the backup servers 104 thereof. However, committing the write transaction when just M of the N backup servers 104, where 0<M<N, have notified the primary server 102 that they have recorded the write transaction, ensures that the system 100 operates in a high-performance manner. For example, there may be N=9 backup servers, where M=7. Thus, even if one or two of the backup servers is performing slowly, this fact does not slow down commitment of write transactions within the entire system 100, since the primary server 102 only waits for M=7 of the backup severs to notify that they have recorded the write transactions before committing the transactions. In one embodiment, N>2 and M>1.

Committing the write transaction can involve performing the parts 218 and 220 in one embodiment of the invention. The requesting device 110 is notified that the write transaction has been committed (218). The write transaction is also recorded to the low-performance storage device, namely the hard disk drive 106 (220). Recording the write transaction to the hard disk drive 106 means that the write transaction is actually processed in relation to the data of the transaction-processing system 100 as stored on the hard disk drive 106. That is, whereas the redo logs of the memories 108 store the step or steps needed to process the write transaction, the hard disk drive 106 actually stores the data of the system 100, such that the write transaction is processed in relation to this data.

In one embodiment, the write transaction may be considered as being committed even before it has been recorded to the hard disk drive 106, so long as M of the N backup servers 104 have record the write transaction in question. In such an embodiment, transaction processing is especially performed in a high-performance manner, because the local redo logs are stored in high-performance memories 108, whereas the hard disk drive 106 is a low-performance storage device by comparison. Thus, transactions may be committed quickly within the transaction-processing system 100, even where the hard disk drive 106 is a low-performance storage device.

The primary server 102 ultimately receives confirmation or notification from the hard disk drive 106 that the write transaction has been recorded to this low-performance storage device (222). At this time, it is known that the data of the transaction-processing system 100 is stored on a reliable storage device, since the hard disk drive 106 is a reliable storage device. Therefore, the local redo logs stored on the memories 108 of the backup servers 104 are no longer needed. The primary server 102 thus instructs the backup servers 104 to delete their local redo logs from the memories 108 as to the write transaction that is the subject of the method 200 (224).

The local redo logs are only needed to reconstruct a write transaction where the write transaction has not yet been successfully processed in relation to the data stored on the hard disk drive 106. However, once the write transaction has been successfully processed, it is guaranteed by the reliable nature of the hard disk drive 106 that the write transaction does not have to be reprocessed. Therefore, the local redo logs are deleted from the memories 108. As has been described, the memories 108 are smaller in capacity than the hard disk drive 106, so the local redo logs are maintained or stored in the memories 108 only for as long as needed, such that there is always room within the memories 108 for the local redo logs of other write transactions.

Figure 3:
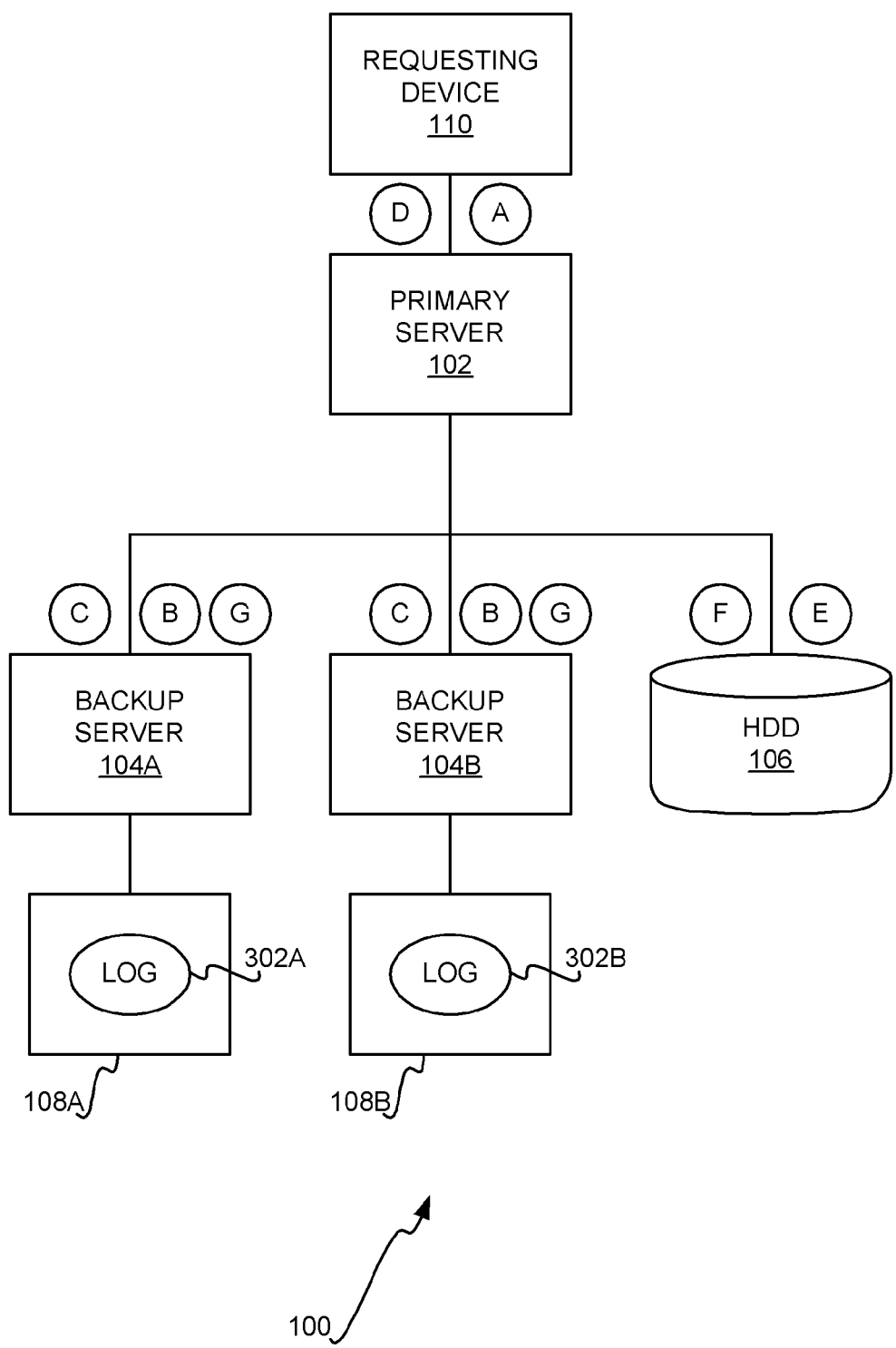
FIG. 3 is a diagram illustratively depicting the performance of the method of FIG. 2 in relation to the transaction-processing system of FIG. 1, according to an embodiment of the invention.

FIG. 3 illustratively depicts the performance of the method 200 of FIG. 2 in relation to the transaction-processing system 100, according to an embodiment of the invention. The primary server 102 receives a write transaction from the requesting device 110, as indicated by the letter A. The primary server 102 thus transmits the write transaction to the backup servers 104, as indicated by the letters B. The backup servers 104 record the write transaction as local redo logs 302A and 302B, collectively referred to as the logs 302, within their memories 108. When this recording process is complete, the backup servers 104 notify the primary server 102, as indicated by the letters C.

Once the primary server 102 has received M<N such notifications, the primary server 102 indicates to the requesting device 110 that the write transaction has been committed, as indicated by the letter D. The primary server 102 records the write transaction to the hard disk drive 106, as indicated by the letter E, and the hard disk drive 106 reports back to the primary server 102 that the write transaction has been processed in relation to the data stored thereon, as indicated by the letter F. The primary server 102 finally instructs the backup servers 104 to delete their logs 302 as to the write transaction, as indicated by the letters G. The backup servers 102 thus delete the logs 302.

Thus, in one embodiment, where the hard disk drive 106 is the bottleneck of the transaction-processing system 100 in that it slows down performance thereof, transactions are recorded to the hard disk drive 106 in a write-behind manner, as has been described in relation to the method 200 of FIG. 2. That is, the transactions are committed in one embodiment before they are written to the hard disk drive 106. As a result, the hard disk drive 106 never stores the newest data within the system 100. At best, it stores the same data as the memories 108 of the backup servers 104, and at worst stores older data than the memories 108. Recovery can then be performed in a high-speed manner, as will be described, without having to access the hard disk drive 106.

In other words, it is guaranteed that one of the local redo logs 302 stores the most recent data within the transaction-processing system 100, as compared to the hard disk drive 106. Therefore, should the primary server 102 fail, recovery can occur in a high-performance manner, because the hard disk drive 106 does not have to be accessed to reconstruct any of the local redo logs 302. The state of a write transaction can thus be recovered at high speed, based on one of the redo logs 302. It is guaranteed that one of the redo logs 302 necessary for recovery exists at one of the high-performance memories 108, because the redo logs 302 are not deleted until the hard disk drive 106 has processed the transaction in question.

The process of the method 200 of FIG. 2, as illustratively described in FIG. 3, is such that when recording has been completed at M of the N backup servers 104, commitment is then accomplished on the hard disk drive 106. Where M>1, there is thus redundancy within the local redo logs 302. Transaction recovery is completed at high speed due to the high-performance nature of the memories 108, and transaction recovery does not require accessing of the hard disk drive 106.

It is noted that in some situations the prior art provides for a redo log, but writes the redo log to a hard disk drive and requires that the schema of the database be changed in order for the redo log to be recorded. However, in practice, there are cases where the schema of a database cannot be changed due to customer specifications. Furthermore, writing a redo log to the same hard disk drive to which the data of the transaction-processing system is written is impractical for two reasons.

First, generally a query is rewritten, in a process known as query rewriting, before an inquiry is made to the database stored on a hard disk drive. Since a query after rewriting is closed, the redo log has to be saved in correspondence with a query before rewriting occurs. As a result, the query before rewriting has to be transferred to the hard disk drive. However, this is inefficient. Second, it takes time to write a redo log before a transaction is completed, which affects transaction processing performance. That is, writing a redo log to a hard disk drive is a slow process, since the hard disk drive is a low-performance storage device.

The redo logs of embodiments of the invention as has been described in relation to the method 200 avoid these problems. Writing to the hard disk drive 106 is accomplished with write-behind, in that the hard disk drive 106 is written to only after commit or transaction data has been copied to the memories 108 of the backup servers 104. This eliminates the possibility that the hard disk drive 106 stores the newest data, such that it is always possible to recover the newest data using only the high-performance memories 108, without involving the low-performance hard disk drive 106.

Figure 4:
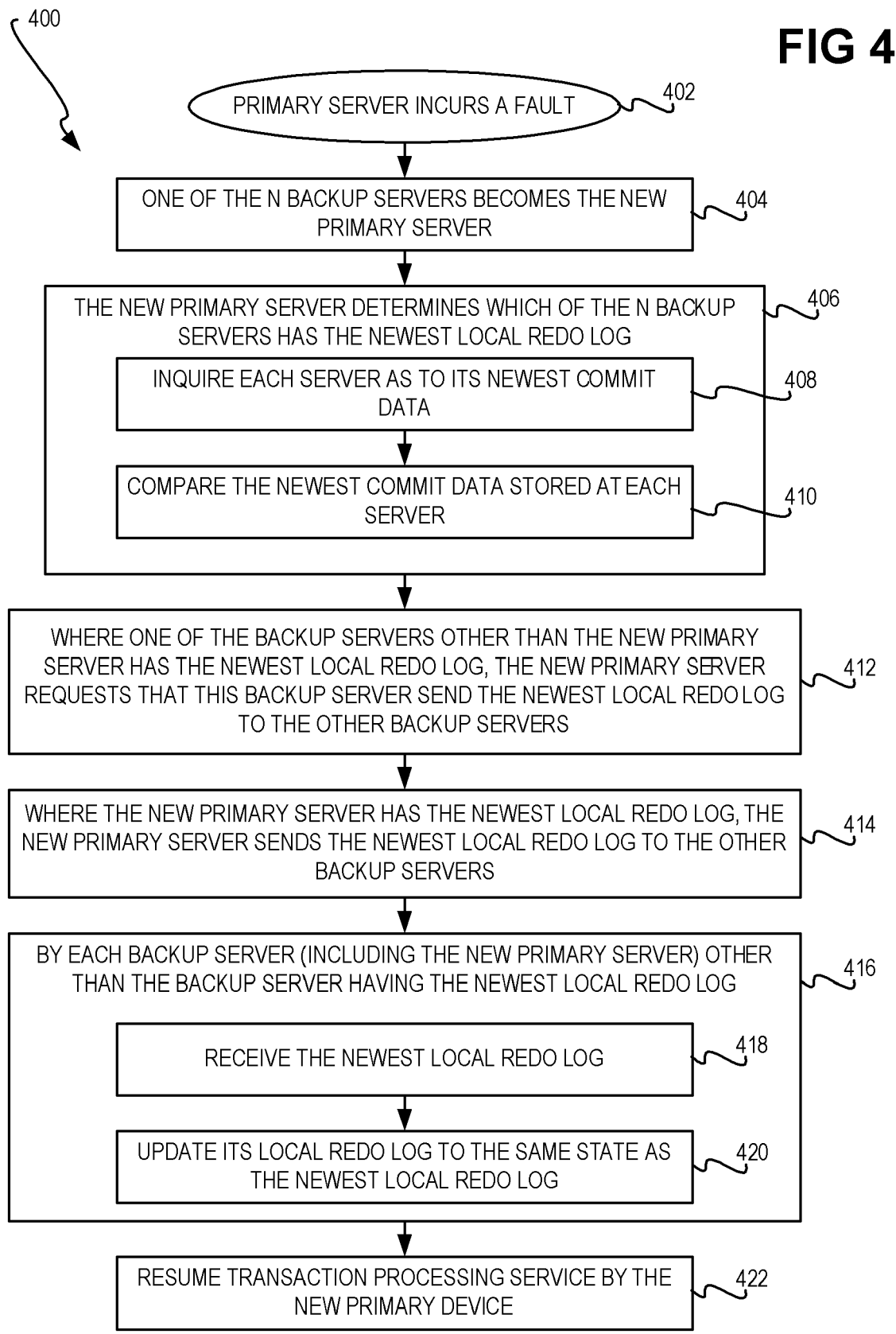
FIG. 4 is a method for high-performance recovery of a fault within the transaction-processing system of FIG. 1, in which transactions are committed in accordance with the method of FIG. 2, according to an embodiment of the invention.

FIG. 4 shows a method 400 for recovering from a fault within the primary server 102 within the transaction-processing system 100 of FIG. 1, according to an embodiment of the invention. The parts of the method 200 are generally performed by a new primary server, such as one of the backup servers 104, except as otherwise noted. For instance, the parts 418 and 420 are performed by each of the backup servers 104, regardless of whether a given backup server is the new primary server or not. The method 400 may be implemented in one embodiment as part of a computer program stored on a computer-readable medium.

The primary server 102 incurs a fault (402), such that it fails or is otherwise shutdown. As a result, one of the N backup servers 104 becomes the new primary server (404). The manner by which one of the N backup servers 104 becomes the new primary server can be accomplished in any manner. For instance, the backup servers 104 may "race" to become the new primary server, and the backup server that wins the race becomes the new primary server. The remaining of the backup servers 104 are referred now as the N−1 backup servers, where the N backup servers 104 still include the backup server that is the new primary server. That is, the N−1 backup servers include all of the N backup servers 104, except for the backup server that has become the new primary server.

The new primary server determines which of the N backup servers 104 has the newest local redo log(406). The new primary server itself can have the newest local redo log in one embodiment of the invention. Because the backup servers 104 record a write transaction at different speeds and potentially at different times, the primary server 102 may have failed while some of the backup servers 104 have completed recording the write transaction to their local redo logs, and while others have not yet completed recording. Furthermore, the primary server 102 may have failed before it has instructed all of the backup servers 104 to record a given write transaction, such that only some of the backup servers 104 have recorded the transaction. Thus, the states of the various local redo logs 302 may be different at the different backup servers 104, such that only one, or less than all, of the backup servers 104 have local redo logs with the newest data. The local redo log or logs that have the newest transaction-oriented data are referred to as the newest local redo log or logs.

In one embodiment, the new primary server determines which of the N backup servers 104 has the newest local redo log as follows. First, the new primary server inquires each of the N−1 backup servers as to the newest commit data that it has stored within its local redo log (408). Next, the new primary server compares the newest commit data received from each of the N−1 backup servers, as well as the newest commit data that it has stored in its own local redo log (410). The one of the N backup servers that has the newest commit data is thus concluded as having the newest local redo log. Where more than one of the N backup servers 104 has the newest local redo log—that is, there is more than one such log having the same newest commit data—the new primary server selects one of these servers as having the newest local redo log for purposes of the method 400.

Where the backup server having the newest local redo log is not the new primary server, the new primary server requests that this backup server send the newest local redo log to all other of the N backup servers 104 (412). If the new primary server has the newest local redo log, then it sends its newest local redo log itself to all other of the N backup servers 104 (414). Therefore, each of the N backup servers 104 other than the backup server having the newest local redo log performs the following (416). First, each such server receives the newest local redo log as has been sent (418), and then each such server updates its local redo log to the same state as the newest local redo log that has been received (420).

As a result, all of the local redo logs of the backup servers 104 are now up-to-date, and the new primary server can resume transaction-processing service (422), such that it is capable of receiving and committing additional write transactions. Furthermore, any transactions that are within the local redo logs that have not been committed may now be recorded to the hard disk drive 106 and committed. In one embodiment, the method 400 takes no greater than thirty seconds. This is possible because the low-performance hard disk drive 106 is not accessed for the recovery process of the method 400. Rather, just the high-performance memories 108 are accessed during this recovery process. It is guaranteed that the hard disk drive 106 never stores the newest transaction data, such that just the memories 108 need to be accessed for recovery.

It is noted that the method 400 that has been described does not require a separate redo log within the database stored on the hard disk drive 106 itself, because there is no possibility that the newest transaction data is stored on the hard disk drive 106. Thus, even if the schema of the database stored on the hard disk drive 106 changes, this does not affect the redo logs 302 stored in the memories 108. That is, the redo logs 302 are independent of the schema of the database for which the transaction-processing system 100 of FIG. 1 stores data.

The technique that has been described thus makes it possible to recover transaction data at high speed, without depending on the hard disk drive 106. That is, the database itself, which is stored on the hard disk drive 106, is not depended on for recovery purposes. Rather, just the redo logs 302, stored on the memories 108, are employed to recover from a fault.

Figure 5:
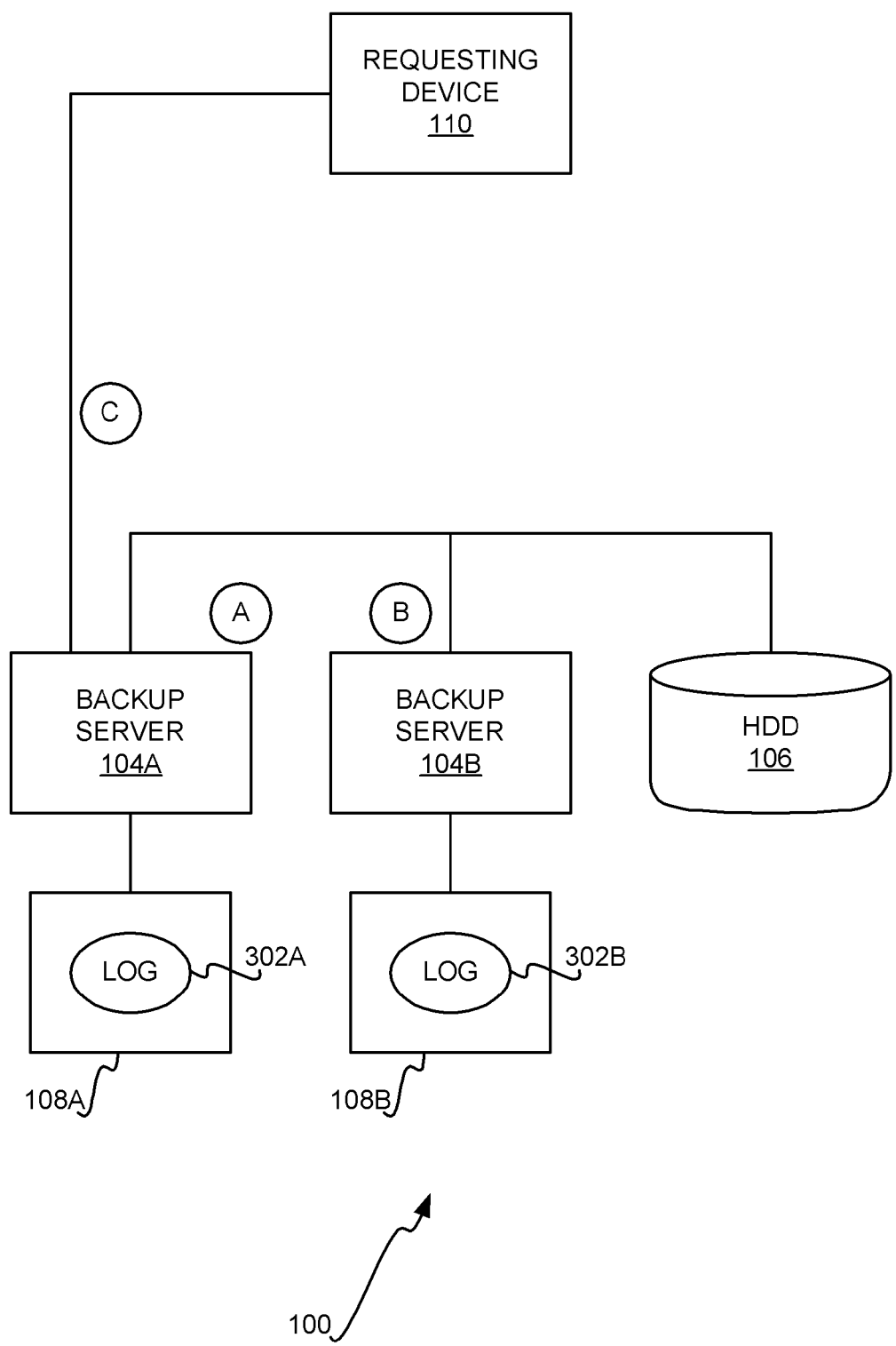
FIG. 5 is a diagram illustratively depicting the performance of the method of FIG. 4 in relation to the transaction-processing system of FIG. 1, according to an embodiment of the invention.

FIG. 5 illustratively depicts the performance of the method 400 of FIG. 4 in relation to the transaction-processing system 100, according to an embodiment of the invention. The primary server 102 has incurred a fault, such that it has been shutdown, as indicated by the server 102 being crossed out in FIG. 5. The backup server 104A has become the new primary server, as indicated by the letter A. The backup server 104 determines which of the servers 104 has the newest local redo log. It does this by inquiring the backup server 104B as to its newest commit data, as indicated by the letter B. The backup server 104A thus compares the newest commit data of the backup server 104B to its own newest commit data.

If the backup server 104A has the newest commit data, then the backup server 104A has the newest local redo log, and sends this log to the backup server 104B, which updates its own local redo log to the same state. If the backup server 104B has the newest commit data, then the backup server 104B has the newest local redo log, and the backup server 104A requests that the backup server 104B send its newest local redo log to the backup server 104A. The backup server 104A then updates its own local redo log to the same state. Once this process has been completed, the backup server 104A is ready to receive new transactions, such as from the requesting device 110, as indicated by the letter C. The recovery process of the method 400 of FIG. 4 as depicted in FIG. 5 at no time requires that the hard disk drive 106 be accessed, and is thus a high-speed operation.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A method comprising:
receiving a write transaction by a primary device;
transmitting the write transaction from the primary device to N backup devices, where N is greater than one;
by each backup device,
  recording the write transaction to a local redo log stored at a high-performance storage;
  transmitting a notification to the primary device that the write transaction has been recorded;
after the primary device has received notifications from M of the N backup devices, where M is less than N,
  committing the write transaction by the primary device;
  after committing the write transaction by the primary device, recording the write transaction by the primary device to a low-performance storage, such that the write transaction is recorded by the primary device to the low-performance storage after the M of the N backup devices have each recorded the write transaction to the local redo log stored at the high-performance storage,
  wherein the low-performance storage has a lower performance than a performance of each high-performance storage;
in response to the primary device incurring a fault,
  one of the N backup devices becoming a new primary device, such that remaining of the N backup devices are N−1 backup devices;
  the new primary device determining which of the N backup devices has a newest local redo log;
  where the backup device having the newest local redo log is one of the N−1 backup devices, the new primary device requesting the backup device having the newest local redo log to send the newest local redo log to all other of the N backup devices;
  where the backup device having the newest local redo log is the new primary device, the new primary device sending the newest local redo log to the N−1 backup devices; and,
  by each of the N backup devices except the backup device having the newest local redo log, receiving the newest local redo log from the backup device having the newest local redo log, and updating the local redo log to a same state as the newest local redo log received.

2. The method of claim 1, further comprising receiving notification by the primary device that the write transaction has been recorded to the low-performance storage.

3. The method of claim 1, further comprising requesting by the primary device to each backup device to delete the local redo log for the write transaction.

4. The method of claim 1, wherein receiving the write transaction by the primary device comprises receiving the write transaction from a requesting device.

5. The method of claim 4, wherein committing the write transaction by the primary device comprises transmitting a notification to the requesting device that the write transaction has been committed.

6. The method of claim 1, wherein the new primary device determining which of the N backup devices has the newest local redo log comprises:
   inquiring each of the N−1 backup devices as to newest commit data stored in the local redo log thereof; and,
   comparing the newest commit data stored in the local redo log of each of the N−1 backup devices and newest commit data stored in the local redo log of the new primary device to determine which of the N backup devices has the newest local redo log.

7. The method of claim 1, further comprising the new primary device resuming service such that the new primary device is capable of receiving and committing additional write transactions.

8. The method of claim 1, wherein the method takes, between the one of the N backup devices becoming the new primary device and the local redo log of each of the N backup devices being updated to the same state as the newest local redo log, no greater than thirty seconds.

9. The method of claim 1, wherein N is greater than or equal to three, and M is greater than or equal to two.

10. The method of claim 1, the high-performance storage of each backup device is one of a non-volatile semiconductor memory and a volatile semiconductor memory, and the low-performance storage is a hard disk drive.

11. The method of claim 1, wherein the high-performance storage of each backup device is an unreliable storage device, and the low-performance storage is a reliable storage device.

12. A system comprising:
   N backup devices, where N is greater than one, and each backup device has a high-performance storage;
   a primary device to transmit a write transaction to the N backup devices for recording to local redo logs stored at the high-performance storages, and upon receiving notifications from M of the N backup devices that the write transaction has been recorded, where M is less than N, to commit the write transaction; and,
   a low-performance storage, such that upon receiving the notifications from M of the N backup devices that the write transaction has been recorded, the primary device is to record the write transaction to the low-performance storage in order to commit the write transaction,
   wherein the write transaction is recorded by the primary device to the low-performance storage after the write transaction has been committed by the primary device,
   wherein the write transaction is recorded by the primary device to the low-performance storage after the M of the N backup devices have recorded the write transaction to the local redo logs stored at the high-performance storages,
   wherein the low-performance storage has a lower performance than a performance of each high-performance storage,
   and wherein, in response to the primary device incurring a fault,
      one of the N backup devices becomes a new primary device, such that remaining of the N backup devices are N−1 backup devices;
      the new primary device determines which of the N backup devices has a newest local redo log;
      where the backup device having the newest local redo log is one of the N−1 backup devices, the new primary device requests the backup device having the newest local redo log to send the newest local redo log to all other of the N backup devices;
      where the backup device having the newest local redo log is the new primary device, the new primary device sends the newest local redo log to the N−1 backup devices; and,
      each of the N backup devices except the backup device having the newest local redo log receives the newest local redo log from the backup device having the newest local redo log and updates the local redo log to a same state as the newest local redo log received.

13. The system of claim 12, wherein the primary device is further to request that the N backup devices delete the local redo logs upon receiving notification that the write transaction has been recorded to the low-performance storage.

14. An article of manufacture comprising:
   a computer-readable recordable data storage medium; and,
   means in the medium for transmitting a write transaction to N backup devices for recording to local redo logs stored at high-performance storages thereof, for committing the write transaction upon receiving notifications from M of the N backup devices that the write transaction has been recorded, and for recording the write transaction to a low-performance storage upon receiving the notifications from M of the N backup devices that the write transaction has been recorded,
   where N is greater than one and M is less than N,
   wherein the write transaction is recorded to the low-performance storage after the write transaction has been committed,
   wherein the write transaction is recorded to the low-performance storage after the M of the N backup devices have recorded the write transaction to the local redo logs stored at the high-performance storages,
   wherein the low-performance storage has a lower performance than a performance of each high-performance storage,
   and wherein, in response to the primary device incurring a fault,
      one of the N backup devices becomes a new primary device, such that remaining of the N backup devices are N−1 backup devices;
      the new primary device determines which of the N backup devices has a newest local redo log;
      where the backup device having the newest local redo log is one of the N−1 backup devices, the new primary device requests the backup device having the newest local redo log to send the newest local redo log to all other of the N backup devices;
      where the backup device having the newest local redo log is the new primary device, the new primary device sends the newest local redo log to the N−1 backup devices; and,
      each of the N backup devices except the backup device having the newest local redo log receives the newest local redo log from the backup device having the newest local redo log and updates the local redo log to a same state as the newest local redo log received.

15. The article of manufacture of claim 14, wherein the means is further for requesting that the N backup devices delete the local redo logs, upon receiving notification that the write transaction has been recorded to the low-performance storage.

* * * * *